Oct. 1, 1963  C. G. ROBINSON  3,105,864
MEANS OF INCREASING ARC POWER AND EFFICIENCY OF HEAT TRANSFER
Filed Jan. 20, 1960
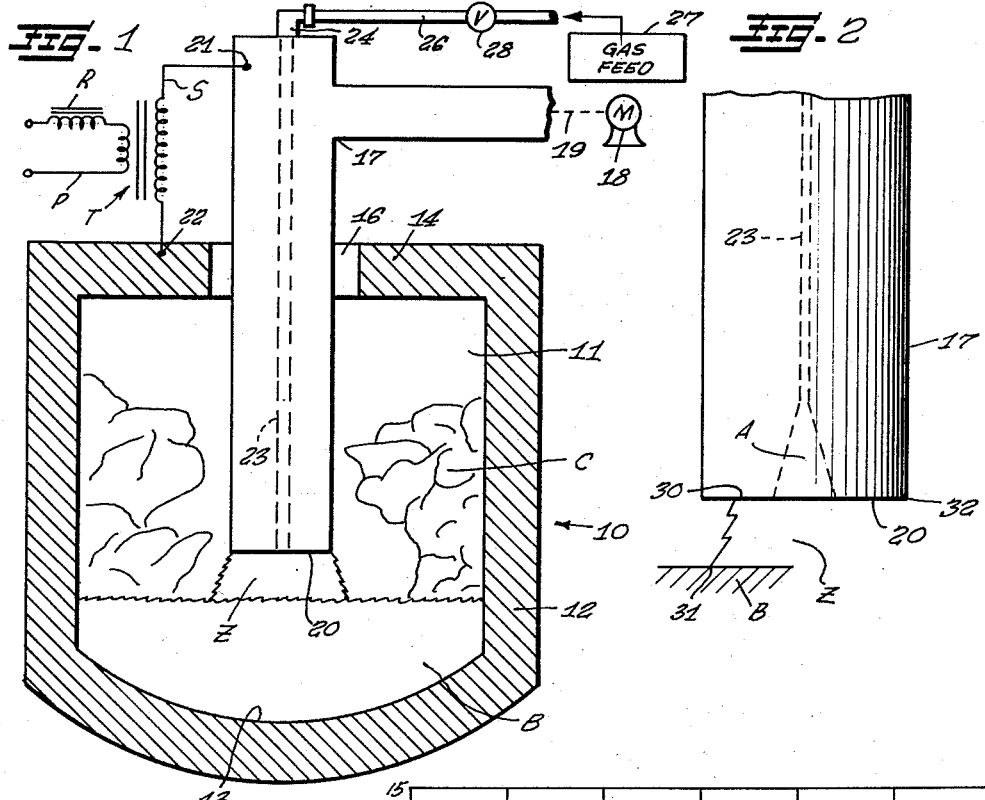
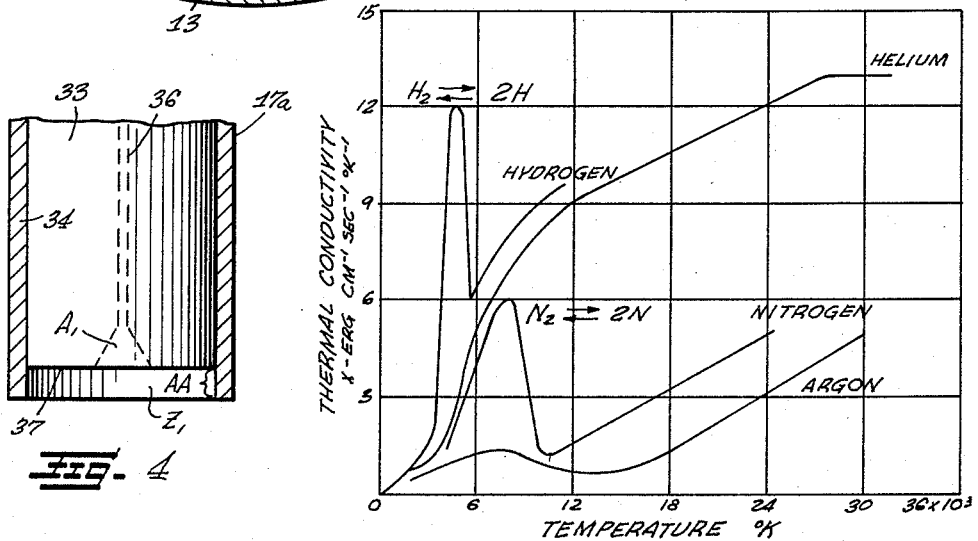
Inventor
Charles G. Robinson

United States Patent Office 3,105,864
Patented Oct. 1, 1963

3,105,864
MEANS OF INCREASING ARC POWER AND EFFICIENCY OF HEAT TRANSFER
Charles G. Robinson, Sterling, Ill., assignor to Northwestern Steel and Wire Company, Sterling, Ill., a corporation of Illinois
Filed Jan. 20, 1960, Ser. No. 3,589
4 Claims. (Cl. 13—9)

This invention relates generally to a method and means of increasing arc power and efficiency of heat transfer and more particularly to improvements contemplated in an electric melting furnace of the so-called arc-type. The electric arc as described by various researchers in the past fifty years involves a gaseous discharge nature; however, it is apparent that the phenomena of the electric arc and the theoretical physics involved in a true explanation thereof are not presently fully understood. Moreover, insofar as the arc function in steel melting furnaces is concerned, research on such installations is impaired because large electric melting furnaces are costly tools of production which do not lend themselves to experimental research.

In the actual production and operation of electric melting furnaces, and particularly in current developments, considerable work has been done in the field of electrical circuitry in order to make electric melting furnace systems more efficient. It has been discovered, for example, that as circuit impedance and reactance is reduced, the problem of arc stability grows larger. Attempts have also been made to change the physical shapes and configuration of the carbon and graphite electrodes. It has also been discovered that due to high current, electric arcs are flared by a self-magnetic field, and that the actual arc zone drawn and maintained between the tip of an electrode and the charge of an electric arc furnace, for example, is characterized by a particularly high current density.

It is an object of the present invention, therefore, to provide a method and means which will increase arc power by bombarding the high density arc zone with gas molecules, whereby the collision of the electrons with the gas molecules will substantially increase the temperature of the arc zone, thereby rendering arc melting more efficient and speeding melting rates.

It is a further object of the present invention to provide an electric melting furnace wherein a graphite electrode column is particularly characterized by the formation of a gas passage therein so that a monatomic gas may be injected into the gas zone during the operation of the furnace.

Yet another object of the present invention is to provide through the introduciton of addittional energy in the arc zone, a thermal expansion sufficient to oppose magnetic compressive forces, thereby to control the geometric form of the arc flare by the interaction of the opposed forces.

Although many other advantages, features and additional objects of the present invention will become manifest to those versed in the art upon making reference to the detailed description which follows, and the exemplary form of the invention as described herein from which the methods of the present invention will be clearly understood.

On the drawings:

FIGURE 1 is a diagrammatic view of an arc-type melting furnace incorporating the principles of the present invention;

FIGURE 2 is an enlarged elevational view of the electrode tip used in the furnace of FIGURE 1;

FIGURE 3 is a graph exemplifying the formulated results of four different monatomic gases as related to thermal conductivity versus temperature (in thousands of degrees Kelvin); and FIGURE 4 is a cross-sectional view of an alternative form of coated electrode which may be provided in accordance with the principles of the present invention.

As shown on the drawings:

Although the principles of the present invention are generally applicable to the problem of increasing arc power and efficiency of heat transfer, the exemplary form of disclosure contemplated herein is the application of the principles of the present invention to an electric arc-type melting furnace.

The general design of an arc-type furnace is that of any furnace construction conventionally provided and for that reason the furnace is herein shown in diagrammatic form only. The furnace is indicated generally at 10 and it will be understood that the furnace can conveniently comprise a heating chamber 11 provided, for example, by a steel bowl with a refractory lining such as is shown at 12. The furnace 10 has a hearth 13 which is a shallow bowl formed in the refractory of the bottom lining and is further shown as being provided with a roof 14 apertured as at 16 to form one or more ports through which vertical carbon or graphite electrodes travel.

An electrode 17 is shown in FIGURE 1 and it will be understood that the electrode 17 may be carried on a winch and rope system, motor driven, or may be actuated by any other form of automatic electrode advancing mechanism such as is shown schematically by the motor indicated at 18 and having a mechanical connection 19 with the electrode 17.

It will be understood that the electric melting furnace 10 is shown only diagrammatically and that any conventional form of charging means can be provided, for example, a door charge type or a top charge type of access mechanism may be provided so a charge of material to be melted shown generally at C may be injected into the heating chamber.

The electrode 17 has a tip 20 which extends into the heating chamber 11 into proximity with the charge C.

In order to draw and maintain an arc between the tip 20 of the electrode and the charge C, or the bath B, after the molten state is reached, electrical circuit means are provided. Thus, as shown in FIGURE 1, a transformer indicated generally at T has a primary circuit shown generally at P connected to the usual source of electrical energy. The secondary circuit S of the transformer T is connected to the electrode 17 as at 21 and to the furnace 10 as at 22. In order to give stability to the circuit and to limit the current when the electrode 17 makes contact with the charge C, a reactance R is included in the primary circuit of the transformer T.

In accordance with the principles of the present invention, the generally cylindrical column of graphite or carbon provided by the electrode 17 is particularly characterized by a centrally disposed small diameter passage 23 extending longitudinally thereof and intersecting the tip 20.

Connected to the top of the electrode 17 as at 24 is a conduit 26 leading to a supply of gas at increased pressure 27. The conduit 26 includes adjustable volume control means shown diagrammatically at 28 so that a metered supply of gas may be fed through the conduit 26 and into the passage 23 of the electrode 17.

The physical characteristics of the arc drawn at the tip 20 are such as to form a confined arc zone indicated by the letter Z in FIGURE 1. Heat energy in the arc is transferred by conduction, radiation, convection and diffusion. All of such factors are affected in some degree by the self-impressed magnetic field, which is in essence, a form of energy. From empirical data and other definite measured quantities, the arc energy can be divided into portions which move axially and which is measured by Ohm's law. That can be observed by the arc flaring out from toe to heel on a graphite electrode.

The second portion into which the arc energy can be divided is that portion which moves in a radial path and which is apparently accounted for by the variation in electrical conductivity in the arc stream. The nature of the arc is an irreversible process of energy transformation involving high current density in the arc area so that the movement of electrons in the arc area in a radial direction constitutes an inciting factor which can be exploited in accordance with the principles of the present invention.

Thus, by feeding a monatomic gas into the passage 23 and injecting the same into the arc zone Z, the collision of electrons with gas molecules produces a substantial increase in temperature of the arc zone which makes the arc melting more efficient and which speeds melting rates. Thus, the high electron density converts the gas into plasma state and increases the tip temperature of the electrode. The reaction of the monatomic gas molecules in the arc zone of high electron density resulting in the consequent temperature increase of the arc zone may be referred to herein as the "plasma function." For a further analysis of the plasma function, the manners of heat energy transfer in the arc may be briefly reviewed. Conduction involves an interparticle transference from a state of higher temperature to a region of lower temperature. Radiation requires no conveying media as radiation involves transfer of heat energy by waves of varying wavelengths. Convection, within the furnace 10 is minimal, since the furnace is enclosed on top and sides, thereby tending to equalize temperatures of the divided masses.

Diffusion, which is intra-atomic, has been formulated by H. Maecker (Berlin, 1951) in his treatment of arc discharge thermodynamics which is as follows:

To determine thermal conductivity of $X$—

$$X = \left[ \frac{\frac{1}{2}KV_0 n_0}{4\sqrt{2Q_0}(n_0+n_+)} \right] + \left[ \frac{[\frac{1}{2}Kn + \frac{2}{3}V(Dn+/DT)]V_+}{4\sqrt{2n_0}Q_0 + \frac{1}{4}nQ_{++}} \right] + \left[ \frac{\frac{1}{2}KV_c n_e}{n_0 Q_0 + \frac{5}{4} n_e Q_+} \right]$$

$K$ = Boltzmann's constant $V_0, V_+, V_e$ = respective thermal velocities of atoms, ions, electrons.

$n_0, n_+, n_e$ = respective particle density of atoms, ions, electrons.

$Q_0, Q_+$ = effective cross section for atoms and ions respectively.

$V$ = ionization potential of the plasma gas.

In FIGURE 2, an enlarged showing of the electrode tip 20 indicates an enlarged conical area A at the extreme end of the reduced section passage 23 extending longitudinally through the electrode 17. That conical effect is naturally produced continuously by the arc impinging around the inner periphery of the feed hole at the point where the passage 23 intersects the tip 20. Thus, as the monatomic gas is forced down the passage 23, the gas will be heated in the graphite column by the arc current flowing through it, whereupon the preheated gas will emerge at the top of the conical section area A. Being already preheated, the final excitation is produced by the high current arc flowing from the annular area 30 to the charge as at 31, the annular area being that portion of the tip 20 lying between the peripheral edge of the enlarged outlet of the passage 23 and the outer peripheral edge of the electrode shown at 32. The extremely high temperature of the graphite volatilization which is 6606 to 6687° F., supplemented by the high electron density will convert the monatomic gas into plasma state, thus increasing the tip temperature of the electrode.

With respect to the form of monatomic gas available for use in practicing the principles of the present invention, reference is made to FIGURE 3 wherein the formulated results of four gases is exemplified relating thermal conductivity as plotted against temperature (measured in thousands of degrees Kelvin). It will be noted that helium is a monatomic gas following a smoothly rising curve, although other monatomic gases such as hydrogen, nitrogen and argon also provide increasing curves. In this respect, hydrogen provides a curve which raises rather sharply, drops off and then follows generally the helium curve. Nitrogen rises rather sharply and after failing off, again rises almost in a straight line function.

In FIGURE 4, a modified electrode structure is shown and is indicated generally at 17a. The electrode structure 17a is constructed to afford a larger plasma zone which is indicated at $Z_1$. The increased plasma zone is effected by providing on a generally cylindrical column of graphite or carbon shown at 33 with a high temperature coating 34. The columnar formed electrode thus provided is again formed with a small diameter centrally disposed passageway shown at 36 which intersects the end surface 37 of the graphite or column and the arc will again produce a conically shaped area shown at $A_1$. The cone effect marked $A_1$ will be supplemented in the electrode 17a by an added area shown at AA which is provided by the outer shell covering of the electrode column. By thus increasing the physical size of the so-called plasma zone, the advantageous results of the present invention can be further exploited.

Although various minor modifications might be suggested by those versed in the art, it should be understood that I wish to embody within the scope of the patent warranted hereon all such modifications as reasonably and properly come within the scope of my contribution to the art.

I claim as my invention:

1. In combination an electric melting furnace comprising a steel bowl with a refractory lining forming a heating chamber having a hearth at the bottom thereof and a roof apertured to form an electrode opening, an electrode extending through said opening, automatic motor-driven electrode-advancing mechanism connected to said electrode to keep one end of said electrode positioned near the charge of materials to be melted in said heating chamber, circuit means including a transformer having a primary circuit connected to an electrical source and a secondary ciruit connected to said electrode and to said furnace bowl, supply means containing a supply of monatomic gas selected from the group consisting of hydrogen, helium, nitrogen and argon, said electrode comprising a generally cylindrical column of graphite having a centrally disposed longitudinal passage, conduit means connected to the top of said electrode outside of said furnace and leading to said supply means, and adjustable volume control means in said conduit means to feed a metered supply of monatomic gas through said longitudinal passage into an arc zone at said end of said electrode, whereupon the collision of electrons and gas molecules produces a plasma function characterized by a substantial increase in arc zone temperature, said electrode comprising a coating of higher melting point than said electrode column forming an outer shell on the external peripheral surface of said electrode column, the electrical arc drawn at said one end of said electrode producing a conically shaped recessed area in said one end of said electrode, said outer shell forming an added recessed area at the said one end of said electrode increasing the physical size of said arc zone in which the plasma function occurs.

2. In an electric melting furnace, means forming a heating chamber for receiving a charge, an electrode comprising a generally cylindrically shaped member made of graphite and having a tip extending into said chamber proximate the charge, circuit means to form and maintain a confined arc zone at said tip, said electrode having a centrally disposed passage formed therein and intersecting said tip, and means for supplying a monatomic gas from a source at increased pressure through said passage to inject said monatomic gas into said arc zone, thereby to bombard the high electron density arc area with gas molecules for increasing the temperature of the arc zone, said electrode comprising a coating on said cylindrically shaped member of higher melting point than said cylindrically shaped member and forming an outer shell for increasing the size of the arc zone.

3. In an arc furnace, an electrode comprising a columnar cylindrical member having a longitudinal passage extending therethrough, said electrode having a tip, said passage having a conically shaped area at the point of intersection between said passage and said tip, and means to supply a monatomic gas from a source at increased pressure through said passage, whereby the gas will be heated in the electrode by arc current flowing therethrough and will be converted into plasma state in a plasma zone at the tip, said electrode having a high temperature coating forming an outer shell of higher melting point than the base electrode to enlarge the area at the tip in which the gas is converted into plasma state.

4. In combination, an electric melting furnace comprising a steel bowl with a refractory lining forming a heating chamber having a hearth at the bottom thereof and a roof apertured to form an electrode opening, an electrode extending through said opening, said electrode comprising a generally cylindrically shaped member made of graphite and having a tip extending into said chamber proximate the charge of materials to be melted in said heating chamber, an automatic motor-driven electrode-advancing mechanism connected to said electrode to keep said tip of said electrode positioned near the charge, circuit means to form and maintain a confined arc zone at said tip, said circuit means including a transformer having a primary circuit connected to an electrical source and a secondary circuit connected to said electrode and to said furnace bowl, said electrode having a centrally disposed passage formed therein and intersecting said tip, and means for supplying a monatomic gas from a source at increased pressure to said passage to inject the monatomic gas into said arc zone, thereby to bombard the high density arc area with gas molecules for increasing the temperature of the arc zone, said monatomic gas being selected from the group consisting of hydrogen, helium, nitrogen and argon, said electrode comprising a coating of higher melting point than said cylindrically shaped member and forming an outer shell for increasing the size of the arc zone.

References Cited in the file of this patent

UNITED STATES PATENTS

| | | |
|---|---|---|
| 941,768 | Dieffenback et al. | Nov. 30, 1909 |
| 1,545,951 | Fairchild | July 14, 1925 |
| 2,116,202 | Honegger | May 3, 1938 |
| 2,303,973 | Armstrong | Dec. 1, 1942 |
| 2,768,279 | Rava | Oct. 23, 1956 |
| 2,970,895 | Clark et al. | Feb. 7, 1961 |
| 3,029,635 | Fetz | Apr. 17, 1962 |

FOREIGN PATENTS

| | | |
|---|---|---|
| 866,106 | Great Britain | Apr. 26, 1961 |